United States Patent [19]

Simon et al.

[11] Patent Number: 5,530,909
[45] Date of Patent: Jun. 25, 1996

[54] METHOD FOR RADIO TRANSMITTING INFORMATION USING AIRCRAFTS AS OPEN TRANSMISSION RELAYS

[75] Inventors: Georges-Henri Simon, Wissous; Cédric D'Silva, Fontenay Le Fleury, both of France

[73] Assignee: Sextant Avionique, Meudon la Foret, France

[21] Appl. No.: 217,880

[22] Filed: Mar. 25, 1994

[30] Foreign Application Priority Data

Apr. 2, 1993 [FR] France .................................. 93 04103

[51] Int. Cl.⁶ .................................................... H04B 7/15
[52] U.S. Cl. ............................. 455/11.1; 455/15; 370/60
[58] Field of Search .......................... 455/11.1, 15, 16, 455/17, 33.1, 56.1, 54.1, 62; 370/60, 17

[56] References Cited

U.S. PATENT DOCUMENTS 5,245,616  9/1993  Olson .................................... 370/60
5,412,654  5/1995  Perkins .................................. 455/11.1

FOREIGN PATENT DOCUMENTS 0201308  11/1986  European Pat. Off. .

OTHER PUBLICATIONS

Bayer, Kenneth. "Packet Switching for Mobile Earth Stations Via Low-Orbit Satellite Network." Proceedings of the IEEE. vol. 72, No. 11, Nov. 1984. pp. 1627–1636.

"Possibilities of stratovision" FM & Television Aug. 1948.

Schwartz "Telecommunication Networks, Protocols, Modeling and Analysis" pp. 259–272, 1988.

Shacham, Nachum. "Protocols for Multi-Satellite Networks." 1988 IEE Military Communications Conference MILCOM '88. vol. 2, Oct. 1988. pp. 501–505.

Roberts, James A. "Concepts for a Low-Altitude Satellite." International Conference on Communications ICC '80 vol. 1. Jun. 1980. pp. 9.1.1–9.1.3.

Andrews, Angus et al. "Knowledge-Based Configuration of Multi-Hop Packet-Switched Radio Networks." Fifth International Conference on Systems Engineering. Sep. 1987. pp. 91–94.

*Primary Examiner*—Reinhard J. Eisenzopf
*Assistant Examiner*—Thanh C. Le
*Attorney, Agent, or Firm*—Browdy and Neimark

[57] ABSTRACT

In order to transmit information between an emitting station and a receiving station separated by a distance exceeding the range of direct communications of said stations, the method according to the invention consists in equipping aerodynes, travelling in the space included between these two stations, with open communications relay systems of limited range which can momentarily interconnect, when within range of one another, in order to pass information from relay system to relay system up to its destination. The invention applies notably to air-to-ground communications for data links in the field of air transport.

12 Claims, 2 Drawing Sheets

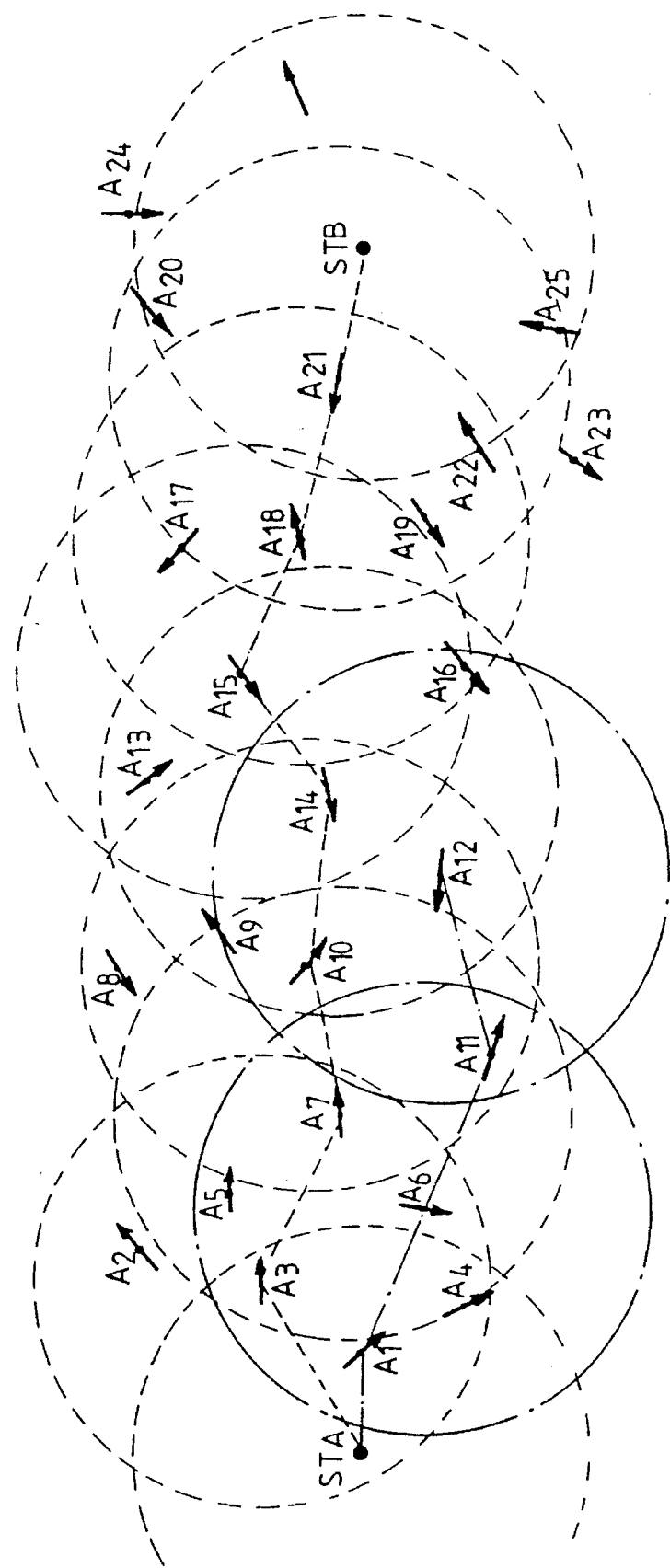

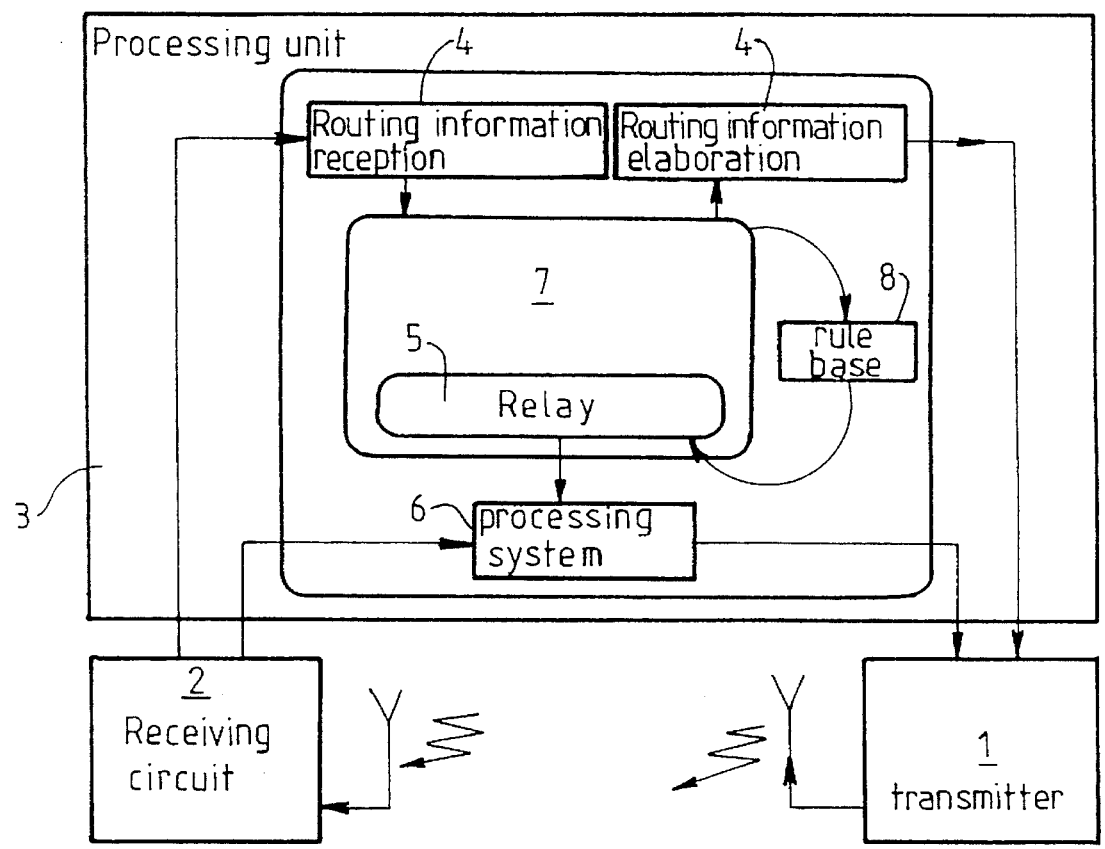

METHOD FOR RADIO TRANSMITTING INFORMATION USING AIRCRAFTS AS OPEN TRANSMISSION RELAYS

BACKGROUND OF THE INVENTION

1. Field of the Invention

This invention relates to a method for the transmission of information by HF or VHF type radio over relatively long distances that exclude any possibility of direct radio link-up and in regions not covered by air-to-ground relay systems. This does not of course exclude the utilisation of this system over shorter distances and even in zones equipped with other relay systems.

It applies notably to air-to-ground communications for data links D/L in the field of medium or long-range air transport.

2. Description of the Prior Art

In a general manner, it is known that, for this type of application, the main means of communication currently used are:
telecommunications satellite networks (SATCOM D/L),
radio transmission (VHF D/L, HF D/L),
radar systems (S mode D/L).

Experience has proved that these different solutions have a certain number of drawbacks.

In fact, the major drawback of VHF type radio communication systems is that their range is limited to radio horizon (radioelectric range by direct propagation). This drawback can only be obviated by the installation of relays between two stations situated out of radio range.

S mode D/L has a similar drawback related to radar range.

It thus appears that, in air transport, only satellite communications (SATCOM), when available, are applicable when flying over ocean or desert regions.

Nevertheless, this solution is still expensive when complete global coverage is required, as presently existing systems require that a large number of satellites be maintained in service in order for one or two satellites to be in view at every point on the globe.

Moreover, this solution puts the user in a position of total dependence with regard to the satellite network owner.

OBJECT OF THE INVENTION

The main object of this invention is to remedy the preceding disadvantages.

SUMMARY OF THE INVENTION

Accordingly, it proposes, to this end, to use the aircraft flying in the course of their normal activities as open transmission relays that permanently exchange information with the relays momentarily within their range, these relays constituting the nodes of a transmission network of constantly varying configuration.

It is based on the observation that, due to the high level of air traffic and to the density thereof, there is a multiplicity of aerodynes, particularly airplanes, whose geographical distribution is at all times such that it enables sufficient radioelectric coverage of the globe or part thereof.

Furthermore, communications requirements are all the greater when traffic is dense.

More precisely, the method according to the invention consists in equipping the aerodynes with open communications relay systems capable of linking up with relay systems of other aerodynes, momentarily located within their radio range, in order to pass information from relay to relay up to its destination.

To achieve this result, the information can be in the form of data packets each containing destination equipment identification data and routing information.

According to an embodiment of the invention, each relay system can advantageously comprise a routing data base susceptible of receiving routing information from neighboring relay systems, and of elaborating the routing information with a view to transmission thereof to the destination. This relay system can also comprise a relaying means which receives the data packets transmitted by the neighboring relay systems and which, prior to transmission thereof towards a neighboring relay system, associates, with these data packets, routing information determined as a function of the routing information initially contained in said packets and routing information elaborated by said base.

BRIEF DESCRIPTION OF THE DRAWINGS

Further features and advantages of the invention will be apparent from an embodiment of the invention described, by way of a non-limiting example, in reference to the corresponding accompanying drawings in which:

FIG. 1 is a schematic representation illustrating the principle of relaying information between two identified stations;

FIG. 2 is a synoptic diagram of a relay system embodying the invention.

DESCRIPTION OF THE PREFERRED EMBODIMENT

In the example represented in FIG. 1, the two stations STA, STB, which could e.g. consist of airports situated on either side of the Atlantic Ocean, are schematically represented by dots.

The airspace included between these two points, which is not covered by a stationary retransmission relay network installed on the ground, is navigated by numerous aircraft following itineraries that sometimes differ from one another.

In this example, the positions occupied by the airplanes at a given moment has been schematically represented by arrows, though it will be clearly understood that these positions, as well as the distribution of the aircraft within the airspace, will change from one instant to another in an almost random manner, seen from the system.

Each of these airplanes is equipped with a VHF type transceiver system whose radio range is represented by a circle having the aircraft as center.

As previously stated, to enable information to be transmitted between the stations A and B, between an aircraft and a station, or even between aircraft, the invention proposes to use the aircraft in flight in the airspace as open relay systems of a retransmission network to ensure the reception, routing and retransmission of this information destined either for another relay system or for the destination station.

More precisely, the function of each relay system is to ensure the relaying and routing, towards other relay systems, of messages in the form of data packets, arranged according to a predetermined frame, which include identification data, data concerning the destination equipment and routing information.

For this purpose, each relay system must be capable of exchanging routes from one routing scope to another, of receiving information on routes from another relay, of classifying these routes and, for each classification, of selecting the best route for each stated destination of a data packet. Each route selected is made available to the relay system and, as a function of the local situation, can be announced to relay systems belonging to other routing scopes comprising routes towards other destinations.

To achieve these results, each relay system comprises, as illustrated in FIG. 2, a transmitting circuit 1, a receiving circuit 2, and a processing unit to process the data received by the receiver 2 and those to be transmitted by the transmitter 1.

More precisely, the processing unit 3 is designed to be permanently capable of:
receiving routing information and messages to be relayed, received by the receiving circuit 2 (block 4),
elaborating routing information (block 4') with a view to destining them for other relay systems, and of processing (block 6) the data packets received to enable them to be transmitted to another relay system or to the destination equipment.

The processing unit comprises a routing data base 7 which receives and classifies the routing information and, more specifically, the data concerning the connectivity and topology of the paths. These data are divided into three categories pertaining respectively to:
the routing tables of the next station,
the lists of next relay systems,
the maps defining the topology of the networks.

The routing tables of the next station contain the data relating to the potential stations that can be selected to route the data packets towards a destination. This information is elaborated from the routing information transmitted by the other relay systems. The list of neighboring relay systems enables local topology to be determined. Network topology maps provide a complete view of the connectivity of the entire network and are used to compute the path by means of routing algorithms.

The routing data base is operated by a rule base 8 which enables the determining, from the data it contains, of routing information concerning the best route to be taken by the data packets received by the relay system.

These data are transmitted to the processing system (block 6) which associates them with the data packets before transmission thereof to the transmitting circuit 1.

The setting up of a communication between two relay systems can be performed automatically and implies a sequence of actions that will be set forth hereinunder.

The existence of a physical connection between two networks is firstly in evidence at the level of the radiofrequency transmitting-receiving circuits 1, 2 of the two relay systems.

Such a connection is of course only set up insofar as the connectivity requirements are fulfilled.

However, a physical connection at the level of the transmitting-receiving circuits does not necessary mean that the connection (with data link) between the two relay systems has been set up.

In fact, failing any particular arrangement, neither of the relays is aware of being linked into the other.

In order to set up this connection, each relay system must transmit an addressing message containing specific data, notably the addressing data of its system.

In this way, when the connection is obtained at the level of the transmitting-receiving circuits, the two relay systems commence periodical transmission of respective addressing messages. Reception by one of the systems of an addressing message transmitted by the other relay causes an acknowledgement message to be transmitted by the first system to the two systems. Once these acknowledgement messages have been received, the two relay systems know they have their respective addresses and can therefore communicate.

Each relay system then performs a data transfer, which can concern e.g. the routing data base 7, by using the address it received from the other relay system. Likewise, it is possible to exchange a request for a channel to be opened (channel open message) and for data concerning the routing scopes accessible by the two relay systems.

Once the connection has been set up between the two relay systems, the periodical exchange of addressing messages can be interrupted.

The first relay system configures the routing data base 7 used by the data packet routing function so that the data packets including a destination address established by means of the addressing message from the second relay system can be transmitted by the connection which has been set up between the transmitting-receiving circuits 1, 2.

The relay system configures the routing data base 7 so as to generate a local function to route the data packets with addresses corresponding to their destination.

At the same time, the second system similarly configures its routing data base to transmit data packets (by way of the radio link previously set up) with a destination address corresponding to that of the first relay system, and to keep the data packets bearing its own address locally.

The two relay systems can then communicate.

The routing specifications require that the relay system save the data relating to the neighboring relay systems before setting up a connection with these relays.

Once this saving has been performed, each relay periodically transmits a request for a channel to be opened until it receives an acknowledgement of its own request from the other relay.

The connection is then "officially" set up between the two relay systems.

The setting up of such a connection is not in itself sufficient to transmit the data packets to their destination.

For this to be possible, each relay must inform the other as to the destinations contained within its scope of routing. These routes are not announced automatically. This takes place subsequent to a motivated decision to accept the data packets coming from distant routing scopes in order to route them towards the destinations in their routing scopes.

Accordingly, once the connection has been set up and if this has not already been performed, each relay system must update the part of its data base 7 defining the rules enabling the determining of routes towards destinations contained in the routing scopes.

Provided appropriate rules exist, each relay system will send the others (in the context of a connection already set up) its update for each route it announces.

Each route comprises data identifying a path, the attributes of the path, and the destinations that can be reached along and at the end of the path (paths which are defined by the different routing scopes).

When a route is received by a relay system, it is recorded in the routing data base (RIB) 7 and a corresponding write operation is performed by a relay function included in block 5 so that all data packets comprising a destination address, which is also a destination along the route, are transmitted by the transmitting-receiving circuits 1, 2 to the other relay system.

In the absence of any other traffic, the relay system periodically exchanges connection maintenance messages. Reception of such a message validates the data previously received and keeps the connection alive. If a relay system no longer receives data packets, over a long period of time, from another relay system with which it was connected, the connection is interrupted (dies) and all the routes previously announced via this connection are declared unavailable and the corresponding entries are deleted from the routing data base 7.

A relay system may, at all times, interrupt a connection by an action generating a stop message. The transfer and reception of a stop message cause all previously announced routes to be lost in the same manner.

A mechanism is of course necessary to chose between the possible routes and to determine which one is considered better than the others.

To make this choice, each relay system implements a route selection algorithm which is applied in an identical manner by all the relay systems situated within the routing scope.

Typically, the route selection algorithm computes the weighted sum of the values of the attributes of selected paths (selected from among the path attributes describing the quality of service available on this path), and the route selected is the one whose sum has the highest value.

In the example represented in FIG. 1, two sample paths have been represented, i.e.

a first path used to transmit data between the stations STA and STB, this path using airplanes $A_3$, $A_7$, $A_{10}$, $A_{14}$, $A_{15}$, $A_{18}$ and $A_{21}$ as retransmission relays, a second path used to ensure a communication between airplane $A_{12}$ and the station STA, this path using airplanes $A_{11}$, $A_6$ and $A_1$.

The method according to the invention could of course further call on, in combination, stationary relay systems installed on the ground and susceptible of being linked to telecommunications systems existing on the ground, or even with satellite-borne relay systems.

This method could be extended to include S mode (radar) communications D/L, in conjunction with an collision avoidance system, e.g. of the T-CAS type. In fact, in such a system, the data transfer takes place when the transponder (aircraft) responds to the interrogation from the radar (ground). The collision avoidance system also sends interrogations to the aircraft in its vicinity. If these airplanes are out of its radar range, they can transfer their data to the interrogating aircraft (relay) and, step by step, the information will pass on to its destination.

We claim:

1. A method for transmitting a message between an emitting station and a receiving station, said stations each having a range of direct communication and being located with respect to each other at a distance exceeding said range, said stations being separated from each other by an airspace crossed by a plurality of aircrafts respectively having trajectories independent from the transmission of said message, said aircrafts travelling in a random way in relation to one another and having respective routing scopes, said aircrafts being provided with respective relay systems for open radiocommunication of limited range which can momentarily interconnect and exchange information therebetween and with said stations when within range of one another, in order to pass information from relay system to relay system up to said receiving station, said relay systems constituting transmission nodes having a configuration which varies constantly, said message being allocated to a destination address of said receiving station, wherein said method comprises the following steps:

a first step of radioconnecting said emitting station with relay systems of aircrafts which are within the range of said emitting station, a second step of selecting by said emitting station, amongst the radioconnected relay systems, a first relay system of a first aircraft having a first appropriate routing scope with respect to said address, a third step of transmitting said message to said first relay system, a fourth step of radioconnecting said first relay system to the relay systems of aircrafts located in the range of said first relay system or to said receiving station when in the range of said first relay system, a fifth step of transmitting said message by said first relay system to said receiving station if said receiving station is radioconnected with said first relay system, or when the receiving station is not in the range of the first relay system, a sixth step of selecting a second relay system of a second aircraft having a second appropriate routing scope with respect to said address and of transmitting said message to said second relay system, said fourth, fifth and sixth steps being repeated until a last selected relay system is in the range of said receiving station and this last relay system has transmitted the message to said receiving station.

2. The method as claimed in claim 1, wherein said message is transmitted by HF or VHF type radio.

3. The method as claimed in claim 1, wherein said message is in the form of data packets each containing destination equipment identification data and routing information.

4. The method as claimed in claim 3, further comprising a step of receiving in a routing data base of each relay system a first routing information from neighboring relay systems within its range, a step of elaborating by said each relay system a second routing information with a view to transmission thereof to said neighboring relay systems, a step of receiving the data packets transmitted by said neighboring relay systems with a view to transmission thereof to one of said neighboring systems, a step of associating with said data packets, a third routing information determined as a function of the routing data initially contained in said data packets and said second routing information.

5. The method as claimed in claim 4, wherein the third routing information associated by said each relay system with said data packets is determined by implementation of a path selection algorithm enabling a choice to be made between different possible routes and enabling determination of a route deemed the best.

6. The method as claimed in claim 5, wherein the path selection algorithm is applied in an identical manner by all the relay systems situated within the routing range.

7. The method as claimed in claim 5, wherein the path selection algorithm computes the weighted sum of the values of the attributes selected and the route selected is the one whose sum has the highest value.

8. The method as claimed in claim 5, wherein, for setting up a connection between two relay systems, said two relay systems transmit messages containing addressing data of their own system, and wherein said connection is only set up when each relay system has received an acknowledgement of its message, addressed by the other relay system, the two relay in possession of their respective addresses being then able to communicate with one another.

9. The method as claim in claim 8, wherein once the connection has been set up between said two systems, each relay system can transfer information by using the address it received from said other relay system, said transfer being susceptible of comprising information concerning said routing data base or routing scopes accessible by each of said relay systems.

10. The method as claimed in claim 4, wherein each time a connection has been set up between two relay systems, each of said two relay system must update its routing data base defining the rules enabling the determining of routes to destinations contained within its routing scope.

11. The method as claimed in claim 1, wherein said relaying means of said first relay system assigns to said data packets to be transmitted to said second relay system the address it received from said second relay system at the time said connection was set up between said two relay systems.

12. The method as claimed in claim 1, wherein said each relay system saves the information concerning the neighboring relay systems prior to setting up a connection with another relay system, and wherein once this saving has been performed, said relay system can transmit a request to have a channel opened until it receives, from a corresponding relay system, an acknowledgement of its own request, and wherein for a data packet to be transmitted, each relay system must have previously informed the other as to the destinations contained within its routing scope.

* * * * *